(No Model.) 2 Sheets—Sheet 2.

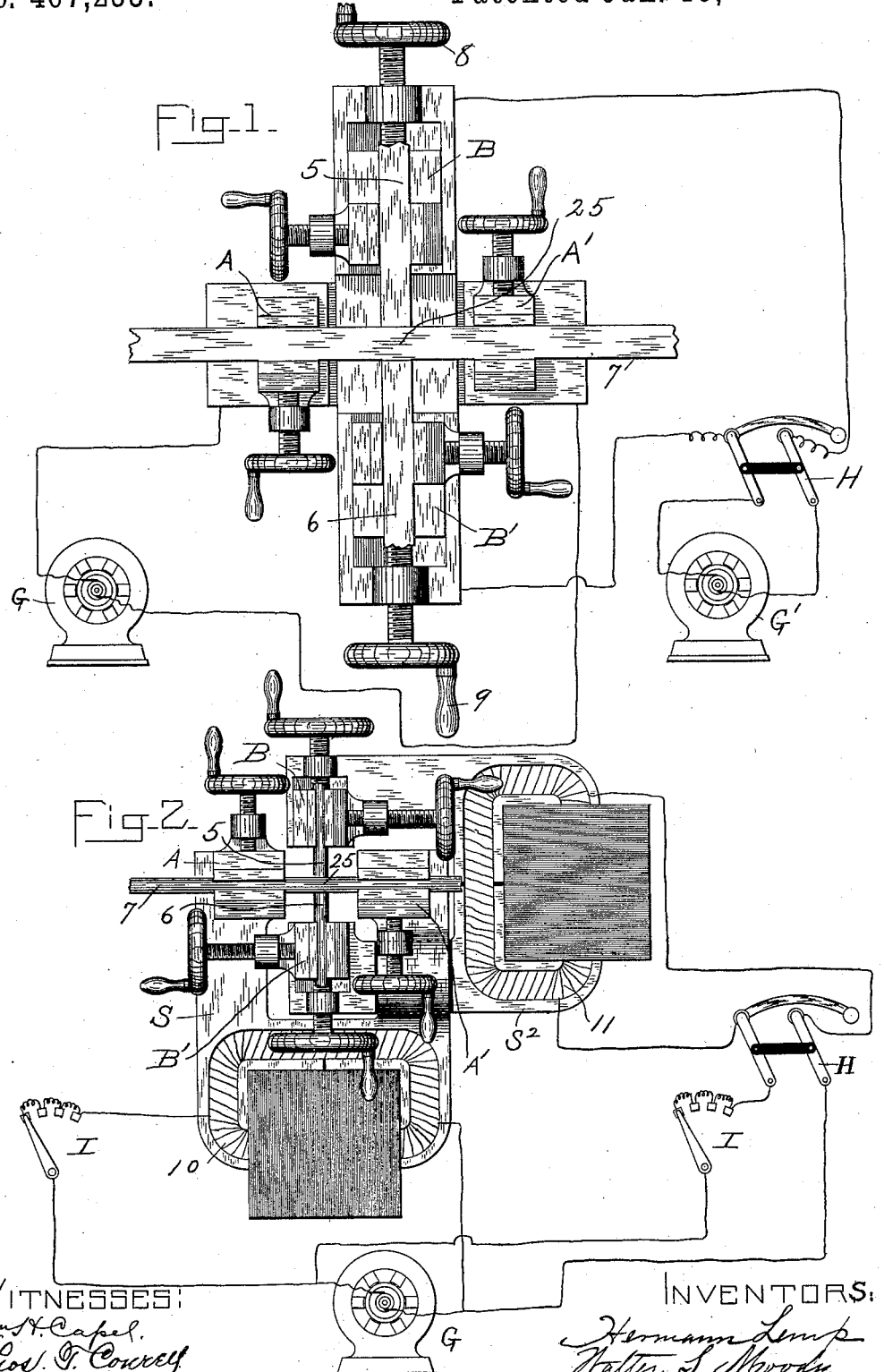

H. LEMP & W. S. MOODY.
PROCESS OF ELECTRIC METAL WORKING.

No. 467,233. Patented Jan. 19, 1892.

WITNESSES:
Wm H. Capel
Thos. F. Courcy.

INVENTORS:
Hermann Lemp
Walter S. Moody
By H. C. Townsend
Atty.

UNITED STATES PATENT OFFICE.

HERMANN LEMP, OF LYNN, AND WALTER S. MOODY, OF CHELSEA, MASSACHUSETTS, ASSIGNORS TO THE THOMSON ELECTRIC WELDING COMPANY, OF MAINE.

PROCESS OF ELECTRIC METAL-WORKING.

SPECIFICATION forming part of Letters Patent No. 467,233, dated January 19, 1892.

Application filed April 23, 1891. Serial No. 390,204. (No model.)

*To all whom it may concern:*

Be it known that we, HERMANN LEMP, a citizen of the United States, and a resident of Lynn, in the county of Essex and State of Massachusetts, and WALTER S. MOODY, of Chelsea, in the county of Suffolk and State of Massachusetts, have invented a certain new and useful Improvement in Processes of Electric Metal-Working, of which the following, taken in connection with the accompanying drawings, is a specification.

Our invention relates to a method of and means for correcting the tendency to localization of effects produced by two electric currents flowing at an angle into or through the same conducting medium, and has particular reference to electric metal-working operations wherein the metal is heated by an electric current.

Our present invention was originally described and claimed in a prior application for patent filed by us October 20, 1890, Serial No. 368,695, wherein we have set forth the novel improvement in electric metal-working, consisting in heating the metal at any point by subjecting it to the combined action of currents passed into or through it at an angle to one another, and we shall herein describe our present invention as applied especially to the heating of metals in the manner described in such prior case.

Our invention consists, generally speaking, in preventing the localization or tendency to localization of the heating effects where the currents are introduced or passed through the material at an angle to one another by periodically reversing the direction of such currents with relation to one another.

Our invention consists, further, in subjecting the material to be heated by the electric current to the compound action of two heating-currents passed into or through the same at an angle to one another, one of said currents being a continuous and the other an intermittently reversed or alternating current.

Our invention consists, further, in an improvement in the method of forming a T or angle joint by an electric welding process, as hereinafter described, and particularly specified in the claims.

Figure 3:
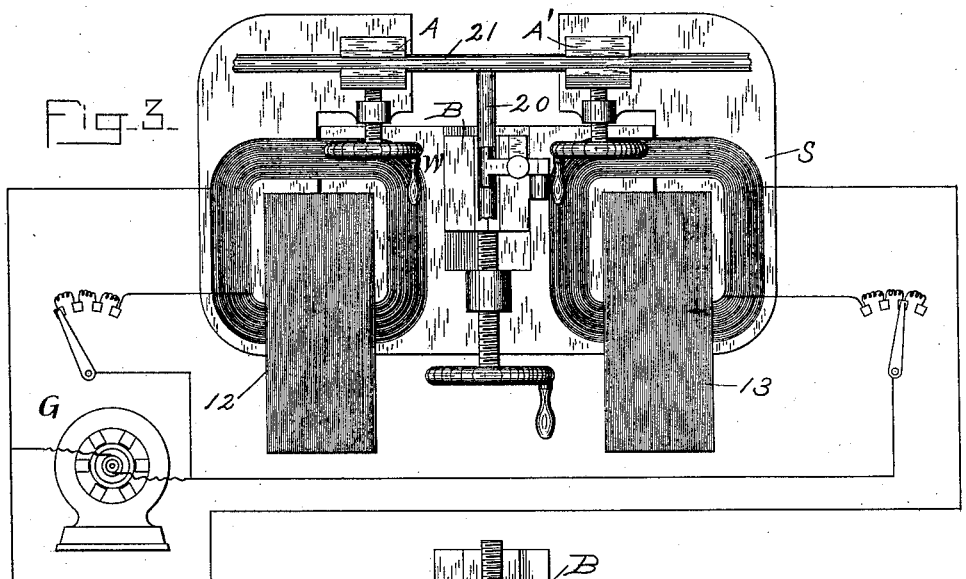
Figure 4:
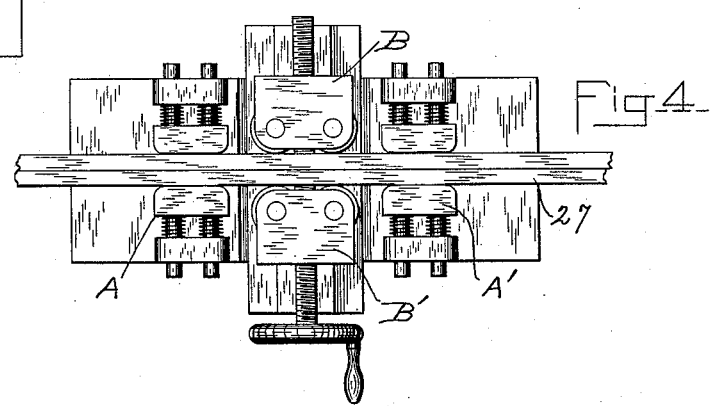
Figure 5:
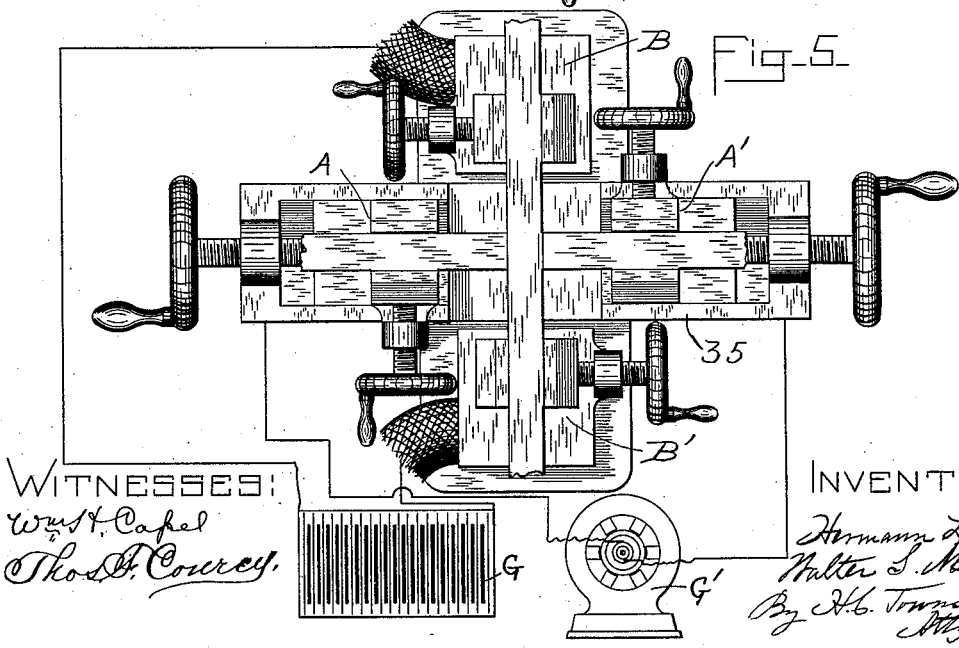

In the accompanying drawings, Figure 1 is a general plan view of two sets of metal-working clamps, holders, or electrodes for an electric metal-working apparatus arranged and combined in accordance with the invention forming the subject of our prior application hereinbefore referred to. Fig. 2 shows a combination of transformers wherein the same desired relation or combination of work-holding electrodes or devices exists. Fig. 3 is a side elevation of a construction of transformer also described in our prior application, and in the use of which our present invention may be applied. Fig. 4 illustrates in plan a modification in the construction of the apparatus forming the subject of our prior application. Fig. 5 illustrates, diagrammatically, one way of obtaining the combined continuous and alternating currents for application to the same part of the work.

Referring to Fig. 1, A A' represent in plan view work-holding clamps or devices, which form the terminals of a source of heating-currents of any desired character, and are provided with the usual clamps or other means for supporting the metal to be operated upon, and passing an electric current into or through the same when placed in position between them.

The devices shown are typical of any devices suitable for the purpose and may be indefinitely modified or varied in their mechanical and electrical construction. It is sufficient that they should form terminals or electrodes of a source or sources supplying electric currents and shall be adapted to pass current into or through the piece or pieces of metal to be operated upon. For purposes of illustrating the invention we have shown them as supporting a continuous bar or rod 7, which is to be heated at a point 25 for the purpose of permitting an angle-joint to be formed at such point between said bar and one or more pieces of metal abutted against the sides of the same.

The work-holding devices A A' may be provided with suitable means for moving them or for moving the work upon them in a direction parallel to the line connecting the clamps or work-holders, or they may be fixed under all conditions according to the nature the work to be done.

B B′ indicate work-holders or electrodes of the same general character, and adapted to support or hold pieces of metal, such as 5 6, or to pass current into or through the same piece of metal which is held on electrodes A A′. The holders B B′ in the present case are shown as provided with operating-screws 8 9, by which they may be moved toward the work-holder on the electrodes A A′.

In the present instance the apparatus is shown as applied to the formation of two angle or T joints at opposite side of the bar 7, the pieces to be joined to said bar to make the angle or T joints being the pieces 5 6. Such pieces might, however, constitute simply the means for passing the current into the bar 7, so as to subject the same to the action of two currents, one passing through said bar from one holder A to the opposite holder A′ and the other passing through or into said bar either from the work-holder B or from the work-holder B′, or passing directly through said bar from one work-holder B to the other work-holder B′.

The two sets or pairs of electrodes may be connected to the same or different sources of power in multiple or series with one another. As shown, one bar is supplied from a source, as G, and the other from an independent source, as G′, which may be of any desired character adapted for furnishing the currents of large volume but comparatively low electro-motive force desirable in electric metal-working operations. The terminals might be the terminals of the secondary bar of a transformer, such as is usually employed in electric-welding operations. This is indicated in Fig. 2, where S shows a secondary of one transformer, and S² the secondary bar or conductor of the other. These transformers might be of the general type described in the patent of Hermann Lemp, No. 428,618, dated May 27, 1890. The poles or terminals of the secondaries are arranged, as shown, with the opposite poles or terminals of one located at opposite sides of the line joining the poles or terminals of the other, and work-holders are mounted upon said poles or terminals in any proper manner, suitable provision being made for moving these holders, which it is necessary to move in the metal-working operation. The primary of one transformer is typified at 10 and that of the other at 11. Each primary is traversed by alternating currents from any source, (typified at G,) and in the circuit of each is placed any device, such as I, for regulating the current, as well understood in the art.

When the apparatus is applied to welding, current is passed through the work at the point 25 from electrodes A A′ and electrodes B B′, the metal being heated quickly at the objected point by the combined effect of the two currents. When the currents pass, as described, and the pieces 5 6 are to be welded to the piece 7, suitable pressure is applied, so as to force the pieces 5 6 against the sides of the bar and weld them to said bar, the parts in contact having been brought to the desired welding temperature by the passage of the two currents through the bar 7—to wit, one longitudinally through the same and the other transversely into or from it at its side at a point between the points of application of the first-named current.

The means shown for imparting movement to the work mounted in the holders B B′ may be indefinitely varied in its mechanical details without departing from our invention.

When the two currents pass into or through the material at 25 in lines transverse or at an angle to one another, there is a tendency to the localization of said currents, or of the heating effects produced by them, the heating being the greater from one corner of the area of contact to that diagonally opposite than elsewhere. This localization or tendency to localization, which it is the object of our invention to correct or nullify, may be explained on the theory that the currents tend to set themselves parallel to one another, the current flowing from A to A′, for instance, tending to set itself parallel to the current flowing from B to B′. Looked at from a different point of view the tendency to localization may be said to be due to the fact that the current flows or tends to flow from the positive pole of G to A to B′, through the work to the negative pole of the source of currents G′, back to the holder B, and thence through the holder A′ to the source G again, thus putting the two currents in series and causing the heating to take place on diagonal or inclined lines through the objective portion 25 of the bar 7. This explanation obviously applies whether the currents passed into the work from said electrodes or holders are continuous currents or are alternating currents, which are in phase with one another. To obviate this difficulty and to distribute the heat more evenly, we propose to periodically reverse the direction of the two currents passed into or through the work at any portion thereof with relation to one another. One of the simplest ways of doing this would be to merely interpose a reversing-switch in one of the circuits, which might be turned by hand or otherwise at stated intervals. This device could be readily applied in the direct circuit of the two electrodes, when the currents employed are not of very large volume, in the manner indicated in Fig. 1, where a reversing-switch H is employed in the circuit of the generator G′. This device would apply whether the two generators are continuous generators or alternating-current generators. When alternating-current generators are employed, the reversal might be effected by simply introducing the pole-changing switch in the circuit of the primary of a transformer, the secondary of which terminates in the holders or electrodes which furnish the current directly to the point of the work to be heated.

A preferable way of obtaining periodical or intermittent reversal of one current with respect to the other, whereby the use of electric switches is avoided, is indicated in Fig. 5, and consists, essentially, in employing a current that is substantially continuous for one of the heating-currents, in combination with a current which is derived directly or indirectly from any usual alternating-current dynamo or source, the reversals in this case being originated in the generator, and the rectification of the tendency to localization of heating effect, as before explained, being automatically secured.

In the figure, G indicates a source of heavy currents, which are continuous or always in the same direction, and which may be a storage-battery. The alternating-current source is the secondary of a transformer welding-machine 35, the primary of which is supplied from any alternating-current generator G', driven by any suitable power. The two sources connect, respectively, to the electrodes which pass the current into or through the work at an angle to one another. The terminals A A' constitute the terminals of the secondary of the transformer, and the terminals B B' form the terminals of the secondary battery. It is obvious that by either of the constructions before described two angle-joints may be simultaneously produced at opposite sides of a bar or rod held between two of the work-holders, or that a single angle-joint may be formed, the bar or piece of metal at the opposite side of the continuous bar being used simply to convey current to the point where the joint is to be formed, and being for such purpose modified in construction or mass, as desirable, or, if desired, one of the electrodes shown might be brought up against the sides of the bar at a point opposite the piece which bears against the other side of the bar and is to be welded thereto to make an angle or T joint. In any case the utility of periodically reversing the direction of the heating-currents relatively to one another will be obvious.

Fig. 4 illustrates a class of work to which our invention would be applicable. In this case the heating is employed for forming a longitudinal joint between two bars, plates, or rods of metal 27. The work-holders A A' hold said bars in position and furnish the current which flows longitudinally through the same while the current is passed at the same time transversely through said bars at a part of the same between the holders A A', where the weld or joint is to be effected by means of contacts B B', which in the present instance perform the same function in supplying current to the work that the work-holders B B' do in other figures. The contacts B B' are supplied with current in suitable volume from any source, and are pressed into contact with the bar, so as to form electrical connection therewith. The welding or other pressure which would be used in the formation of a longitudinal joint in the case illustrated may be applied by means of the blocks or pieces B B', such blocks in such case performing a twofold function of contacts and of pressure-blanks. The form of the pressure-surfaces of B B' might obviously be conformed to a particular shape to be produced in the work that is held between the terminals or work-holders A A', and the same devices (illustrated in Fig. 5) would be obviously applicable to other kinds of metal-working besides electric welding—as, for instance, to forging or shaping of a piece or rod of metal placed between the holders A A' and B B'. This particular apparatus is not herein claimed as our invention, because it forms with other devices the subject of our application before referred to and filed October 20, 1890, Serial No. 368,695.

In Fig. 3 another construction of apparatus suitable for passing two currents into or through the same mass of metal to be heated is shown. It may be used in the formation of T or angle joints, or, with suitable modifications in the construction, in the formation of the usual welded joints between two pieces of metal placed in line. This apparatus embodies a peculiar construction of transformer described in our original application before referred to, and claimed in an application for patent filed by us May 26, 1891, Serial No. 394,214, as a division of an application filed by us October 20, 1890, Serial No. 368,695. S is the secondary bar or conductor of the transformer, which, at an intermediate portion of its length, as at W, has a pole adapted for connection with the work and constituting, through the application of inducing primary coils at opposite sides of such intermediate portion, a point of division in a source of electric energy, the opposite poles of which are connected to the work-holders A A', so as to pass a current directly from one to the other of said holders. The inducing primaries and the usual or proper iron cores are indicated at 12 13, and are applied to said bar or conductor S in proper manner to induce secondary currents in the same direction, which will flow in series from one to the other terminal of the secondary bar. The manner of applying the coils and iron we do not describe more in detail, as it may be varied without departing from our invention. At 21 is indicated a bar or piece of metal placed between the terminals of the secondary S and heated by the passage of current from one terminal or work-holder to the other.

In the use of the apparatus described for forming a T-joint by welding the piece of metal 20 to the side of the bar 21 the intermediate pole or projection W of the secondary is provided with or is in electrical connection with a holder B, of any suitable construction, mounted on or in electrical connection with the secondary. Such holder should be and is preferably provided also with means for forcing the piece 20 against the side of the piece 21. Suitable means are provided for regulating the flow of current in each primary, so as to vary the electro-motive force of each part or portion of the divided source of energy thus constituted, according to the nature of the metal pieces to be operated upon. If the two primary currents are equal in the inducing-coils, the flow of the secondary current will be through the bar 21 from A to A' entirely. By increasing, however, the effect of one or the other primary by means of the regulating apparatus a greater or less amount of current may be made to flow through the intermediate pole, which is connected by the piece 20 with the piece 21 and complete its circuit on whichever side of the source is given the higher potential. These devices provide a means whereby the total amount of current flowing in one piece, as 20, compared with that flowing through the whole extent of the other, as 21, may be regulated; but at the point of junction of the two it is clear that the metal will be heated by the combined action of the two currents, one passing from one electrode A to the other A' and the other passing to or from the electrode or metal 20. The direction of the latter current will also obviously depend upon which side or portion of the divided source of energy has the greater relative potential. While, therefore, there might be a tendency to the localization of heating at one corner of the point of connection of the two pieces of metal, if the current were allowed to pass to or from the point of division of the source constantly in one direction such tendency may be compensated for and a more even distribution produced by periodically reversing the direction of relative direction or flow by causing the higher potential to exist on the other side of the divided source, thus changing the relative direction of the two heating-currents. These devices, while they afford a means of practicing our present invention, are not herein specifically claimed, as they form the subject of claims in another application for patent filed by us May 26, 1891, Serial No. 394,214, wherein we have described the apparatus as employed for preventing overheating of one end of the bar 21, and have claimed the method of preventing overheating consisting in alternately increasing the potential of the two sides of the divided source. Such tendency to overheating of one end of the bar 21 will be obviously due to the fact that when current is passed partly through the bar 20 one end of the bar 21 will be traversed not only by currents passing from A to A', but by that passing through the bar 20, while the other end of the bar 21 will be traversed only by that portion of the current which passes from one terminal A to the other A'. This effect, which is rectified by alternately increasing the potential of the two sides of the divided source is, however, one only of the tendencies which may be compensated for, and is entirely different from the effect or tendency to localization of heating at the point where the currents pass through or into the metal at an angle, which tendency to localization may be rectified by the reversal of the relative direction of the heating-currents at such point, as just described.

We do not herein claim the method of or the apparatus for forming a T or angle joint between pieces of metal in the manner hereinbefore described, excepting when such process is combined with a reversal in the direction of the heating-currents with relation to one another. The broad method forms the subject of an application filed by us October 20, 1890, Serial No. 368,695.

What we claim as our invention is—

1. The herein-described improvement in electrically heating a piece of metal, consisting in subjecting the same to the compound action of heating-currents flowing in the metal at an angle to one another, one of said currents being a continuous and the other an intermittently-reversed or alternating current, as and for the purpose described.

2. The herein-described method of correcting the tendency to localization of effects produced by two electric currents flowing at an angle into or through the same conducting medium, consisting in periodically reversing the direction of such currents with relation to one another.

3. The combination, in an electric metal-working apparatus, with pairs of work-holding clamps arranged on intersecting lines, of means for supplying a continuous current to one pair of clamps, and means for reversing the current supplied to another pair, as and for the purpose described.

4. The herein-described improvement in electrically heating a piece of metal, consisting in subjecting the same to the action of heating-currents passing through or into it at an angle to one another and periodically reversing the direction of said currents with relation to one another for the purpose of correcting the tendency to the localization of the heating current or effect.

5. In an electric metal-working apparatus provided with work-holders or electrodes, whereby the electric heating-currents may be passed through or into the same part of the work at an angle to one another, the combination, substantially as described, of an alternating-current source and a continuous-current source supplying the coacting currents.

6. In an electric metal-working apparatus, the combination, with metal-working clamps or electrodes arranged to pass currents through or into the same portions of the work on lines at an angle to one another, of a continuous-current source supplying the one heating-current and an alternating-current source supplying the other heating-current.

7. The herein-described improvement in forming an angle or T joint, consisting in passing an electric current through one of said pieces, abutting said pieces at the desired angle, passing an electric current across the joint, and periodically reversing the direction of the heating-currents with relation to one another, as and for the purpose described.

8. The herein-described method of welding one piece of metal to the side of another, consisting in passing an electric current longitudinally through the latter piece, abutting the first-named piece against the side of the latter, passing an electric current transversely through the piece in which the current flows longitudinally, and periodically reversing the direction of the two currents with relation to one another at the point of heating.

9. The combination, with two similar sources of electric energy having intersecting work-circuits, of a current-reversing switch in the circuit of one of said sources, as and for the purpose described.

In testimony whereof we have signed our names to this specification, in the presence of two subscribing witnesses, on this 14th day of April, A. D. 1891.

HERMANN LEMP.
WALTER S. MOODY.

Witnesses:
WARREN B. LEWIS,
JOHN W. GIBBONEY.